United States Patent [19]
Kaiser

[11] Patent Number: 5,507,859
[45] Date of Patent: Apr. 16, 1996

[54] SAFE COLLECTION AND DISPOSAL OF HAZARDOUS, DRY PARTICULATE MATERIAL

[76] Inventor: David M. Kaiser, 1403 Woodland Ave., Santa Paula, Calif. 93060

[21] Appl. No.: 415,610

[22] Filed: Apr. 3, 1995

[51] Int. Cl.[6] ........................................... B01D 46/00
[52] U.S. Cl. ........................ 95/273; 55/373; 55/375; 55/378; 55/DIG. 3
[58] Field of Search ............................ 55/361, 371, 373, 55/375, 378, 472, DIG. 2, DIG. 3, DIG. 8; 95/273

[56] References Cited

U.S. PATENT DOCUMENTS

| | | | |
|---|---|---|---|
| 2,539,195 | 1/1951 | Lang | 55/378 |
| 2,652,902 | 9/1953 | Sheahan | 55/378 |
| 3,195,296 | 7/1965 | Janson | 55/361 |
| 3,771,664 | 11/1973 | Schrink et al. | 55/373 |
| 4,828,187 | 5/1989 | Davis et al. | 241/24 |
| 5,215,562 | 6/1993 | Kaiser | 55/294 |

*Primary Examiner*—C. Scott Bushey

[57] ABSTRACT

A process, and apparatus for practicing the process, for removing hazardous material collected on a cleanable HEPA filter in a manner which protects operating personnel from exposure to that hazardous material comprising use of a bag composed of high efficiency filter material, the bag being positioned within a vacuum container having a removable lid. The bag has an open top which extends out of the container during the cleaning operation, the container being closed by a removable lid. The system allows the lid to be removed and the bag sealed and extracted from the container without shutting off the vacuum generated flow of air.

2 Claims, 3 Drawing Sheets

SAFE COLLECTION AND DISPOSAL OF HAZARDOUS, DRY PARTICULATE MATERIAL

RELATED APPLICATION

The invention disclosed and claimed herein is an improvement over that shown in my copending application for METHOD AND APPARATUS FOR FILTRATION OF AIRBORNE PARTICULATE MATERIAL, Ser. No. 08/062,433 filed May 13, 1993, now abandoned, which was a continuation-in-part of my prior application Ser. No. 07/928,707 filed Aug. 13, 1992, entitled METHOD AND APPARATUS FOR HAZARDOUS WASTE DISPOSAL, now abandoned.

BACKGROUND OF THE INVENTION

The removal from air of airborne particles, whether large or microscopic, has been successfully accomplished for many years by prior developed filter systems. At the present time, however, there is a serious need for air handling systems that will permit the safe disposal of hazardous particles, such as viruses, bacteria, and floating particles that are injurious to the human breathing system, general human health and food and food products, which are collected by those prior filter systems.

Some systems for removal from air of airborne particles have utilized a wet process for that removal. An example of a wet collection system is U.S. Pat. No. 4,828,187 which is designed for collection of asbestos. This patent uses a separation chamber into which a nonporous bag is placed for gravity collection of material soaked with water, the vacuum being used to hold the nonporous bag in the separation chamber and not to filter but contain the collected material. Other deficiencies of wet systems are that they are readily plugged by the moist particulate matter and the wet environment presents a particularly advantageous place for growth of collected viruses and bacteria, thus creating a more hazardous condition in the system. The present invention, is directed to a dry process which allows safe disposal of collected hazardous material and eliminates the additional hazards created by the use of a wet collection system.

One situation where there is a special and very acute need for removal of hazardous particles from air is in hospital isolation rooms, areas where hazardous virus or bacteria are handled, environments conducive to the growth of viruses and bacteria and the like. In particular, in hospitals and nursing facilities patients with tuberculosis and other diseases that are communicable through airborne bacteria need to be isolated from other patients, treating personnel and visitors by means of appropriate air filtration systems.

SUMMARY OF THE INVENTION

The present invention provides a dry method and apparatus for safe removal from the air and safe disposal of hazardous dry particulate material.

The apparatus of the invention includes a HEPA media in the form of an open-topped bag rather than the customary serpentine folded filter material. The material of construction of the bag is physically suitable for acting as a HEPA filter when air is pulled through it, and also for being closed after the filtering process has been completed so as to act as a disposal container. In order to permit its proper closure after the filtering process is completed the bag is provided with an extended and outwardly flared top end portion.

Another feature of the apparatus is a container arranged to hold the bag in an expanded condition before, during, and after the filtration process, and also to hold the bag and its contents in a particular manner with a continuous vacuum while its previously open top is being securely closed. A vacuum source associated with the container operates to establish the open position of the bag in the first instance, pull air through the wall of the bag during filtration, maintain the air flow through the bag wall while its open top end is being closed, and hold the material collected in the bag in a safe manner during the closure procedure.

The invention also provides a method for disposing of dry airborne particulate material collected in a vacuum filter system in which the vacuum force is continuously applied to the container, the filter media (i.e. the filter bag), and the collected particulate material during the time the filter media containing the collected material is being sealed for later disposal. The filter bag can then be safely removed from the filter system for transport elsewhere, without the loss of any of the particulate material that had already been captured in it.

More specifically, according to a preferred form of the invention a vacuum bag having one open end and being made of a flexible, porous filter media material is supported in an open condition in a container; a vacuum is applied to the outer surface of the bag, thus drawing airborne particulate material from the air into the open end of the bag so that particulate material becomes deposited in the bag; and, while the vacuum is still being thus applied, closing the open end of the bag so as to prevent escape of the particulate material.

More particularly, the vacuum bag is supported within a porous or perforated frame, which is in turn supported in spaced relation within the container, the container having walls impervious to the flow of air. The vacuum force is then applied to the space between the impervious container and the porous frame.

The invention has particular utility for removing from the air and subsequently disposing of hazardous materials such as mold spores, bacteria, viruses, asbestos fibers, and hazard metals such as lead or beryllium particles.

The invention is disclosed in a fixed installation for removing hazardous material such as bacteria and viruses from a patient isolation area; and also, as the preferred embodiment, in a portable machine which may operate in that environment for removing and disposing of airborne particulate material captured by a filter system within the isolation area.

DRAWING SUMMARY

DETAILED DESCRIPTION OF PREFERRED EMBODIMENT

Figure 1:
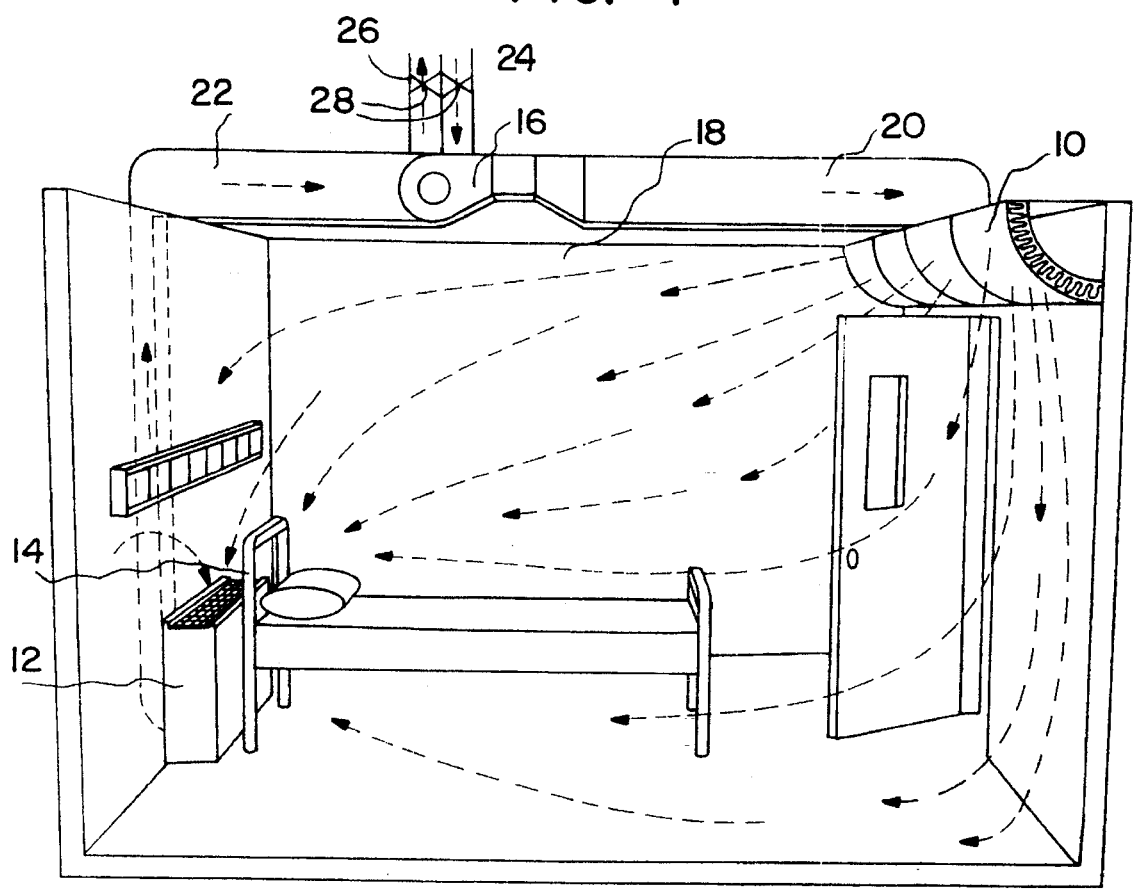
FIG. 1 is a schematic elevation view of a hospital room utilizing an air supply system and a stationary but cleanable HEPA filter system in accordance with the present invention.

Apparatus incorporating the invention take advantage of particle interception, impaction, sieving, diffusion, electrostatic attraction, gravity and continuous vacuum forces working in consort to retain collected hazardous materials in place while the collection system is opened and until the filter media and collected material are secured once removed from the system for disposal. FIG. 1 shows the application of the invention to a special retrofitted hospital room. A unidirectional air flow, shown by the arrows, is created from a near-ceiling air distributor 10 on one side of room to a stationary HEPA filter 12 located behind the head 14 of the patient's bed, In the embodiment shown the air flow originates from a forced air blower 16 located above the ceiling 18. The blower 16 forces the air through the delivery duct 20 to the air distributor 10 where the air is forced into the room. The air blower 16 also pulls air from the exhaust duct 22 which is attached to the exit end of the stationary HEPA filter 12. This arrangement causes the air forced through the air distributor 10 to flow across the room and over the bed and patient (not shown) in a toe-to head manner and exit the room through the stationary HEPA filter 12. If additional makeup air is desired or required it is provided my a make up duct 24 attached to the blower. In this manner the filtered air can be recirculated while it is supplement by feed air from outside the room. Alternately, the air in the exhaust duct 22 can be directed through a waste duct 26 to the exterior and all the air delivered can be makeup air or, using control valves and dampers 28 in the makeup and waste duct 24, 26, any mixture can be obtained. The system incorporating features of the invention allows people to walk into the room and communicate or examine the patient without being exposed to contaminated air, The method of the invention is a two-step, two-filter process. The first filter is a HEPA filter permanently positioned, such as the stationary filter 12 in the hospital room described above, which is cleanable such as is shown in U.S. Pat. No. 5,215,562 entitled SELF-CLEANING FILTER APPARATUS, issued Jun. 1, 1993, which is incorporated herein by reference. This filter 12 allows negative pressure to be continuously applied to it while cleaning particular segments with a second vacuum system which provides a single directional air flow.

Figure 2:
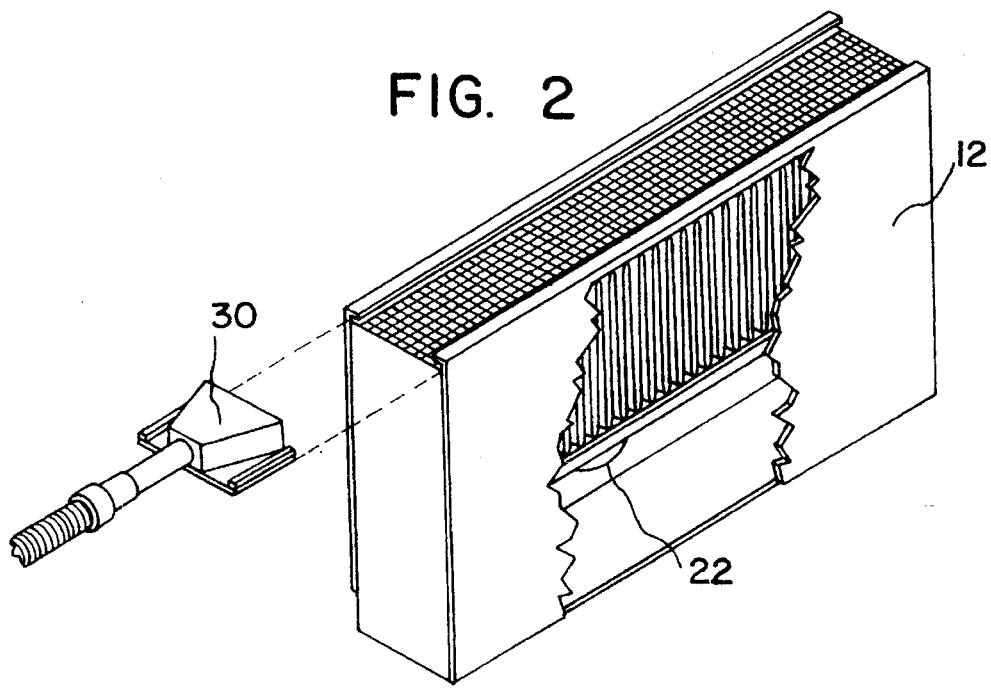
FIG. 2 is a perspective view of the stationary HEPA filter of FIG. 1 as it is being cleaned.
Figure 3:
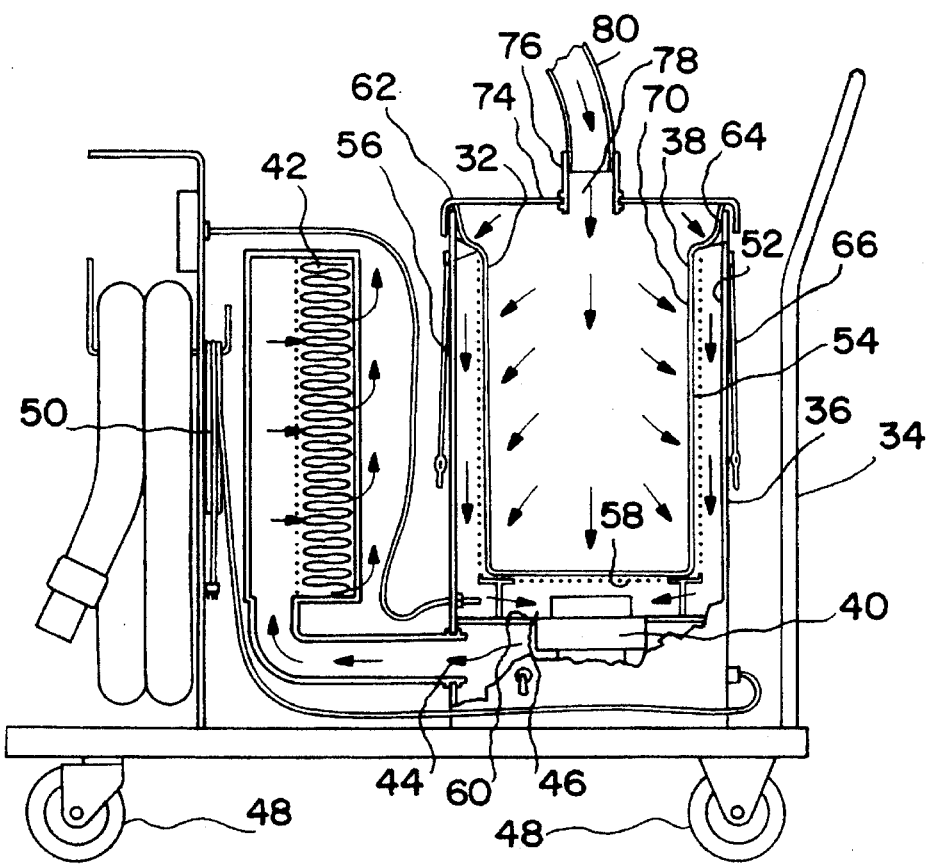
FIG. 3 is a cross-sectional elevation view of a portable unit containing a porous bag and supporting container that are the operative portions of a second HEPA filter that is used for cleaning the stationary filter.

FIG. 2 shows a cleaning head 30 which is attached to a second filter 32, shown in FIG. 3, which is also a HEPA filter. The cleaning head 30 is used to transfer material from first filter 12 to the second filter 38, for subsequent disposal of the transferred material by discarding the second filter 38 and its contents using a process that is safe for maintenance personnel and which does not require extensive training in hazardous disposal techniques.

FIG. 3 shows the transportable unit 34. It includes a roller mounted canister 36 containing a bag filter 38 and vacuum generating apparatus 40, the vacuum apparatus 40 having a final filter 42 attached to its exhaust side 44. The canister 36 holding the bag filter 38 is a cylindrical housing or container, preferably made of metal or rigid plastic which is impervious to air flow except for an exit port 46 at the bottom, which is connected to the vacuum generating apparatus 40. Wheels 48 are provided for ease in moving the transportable filter/ vacuum unit 34 about. The vacuum apparatus 40 is energizing by attachment, using an electrical cord 50 provided, to an ordinary wall type utility electrical outlet (not shown).

Mounted within the canister 36 and spaced from the canister inner wall 52 is a perforated inner frame 54 made of screen, wire mesh or the like, the frame 54 being concentrically positioned in spaced relation to the inner wall 52 of the canister 36. An annular space 56 is thereby created between the container 36 and the perforated inner frame 54. The bottom wall 58 of the perforated frame 54 is supported in spaced relation above the base 60 of the canister 36. In an alternate version the bottom may be solid or have a percent open area less than the vertical sides.

In accordance with the invention a filter bag 38 made of a flexible, controlled porosity filter media is supported in an open position within the perforated frame 54. FIG. 3 shows the upper end of perforated frame 54 terminating a distance below the top edge 62 of the canister 36. While this feature is beneficial to efficient operation of the system 34, the system 34 is still operable with the frame 54 extending closer to the top 62 of the canister 36 as long as the sealing of the canister 36 is not interfered with. The filter bag 38 also extends above the upper end of the perforated frame 54 and has a loosely hanging portion 64 of its length which spreads out in a somewhat conical shape above the annular space 56 between the canister inner wall 52 and the perforated inner frame 54 and the inner wall 52 of the canister 36, so as to maintain a sealing contact of the filter bag 38 with the wall 52 during disposal operations, due to force created by vacuum in the annular space 56.

The upper extremity 66 of the filter bag 38 is turned over the top edge 62 of the canister 36 and hangs down its outside surface. A temporary closure, such as an elastic band 68 shown in FIG. 3 near the top edge 62 of the canister 36 is placed over the turned-over upper extremity 66 of the bag 38 to hold the top end of the bag 38 in place. The portion of the bag 38 extending outside the container may be formed of the same filter media as the portion enclosed in the container 36 or, alternatively a nonporous plastic film or fabric as it does not act as a filter but must retain the contents once removed from the container 36.

In the embodiment shown, the vacuum generating apparatus 40 is a vacuum blower which is located underneath the canister 36 and connected to the annular space 56 through an opening in the bottom wall 60 of the canister 36. The blower 40 pulls air through the annular space 56, causing the filter bag 38 to be held against the mesh 54. Because the filter bag 38 is porous the air drawn through the blower 40 is also drawn through the wall of the filter bag 38 causing particulate matter in the air to be collected against the inner surface 70 of the filter bag 38. The air exiting the blower exhaust 44 is driven through the final HEPA filter 42, where it then exits to atmosphere. FIG. 3 shows the material of the final filter to be accordion folded to provide a high surface area for particulate collection but other filter designs can be used.

A lid 74 fits on top edge 62 of the canister 36, and when the filter bag 38 is in place as shown in FIG. 3, it also serves to hold the filter bag 38 in position and give support. A vacuum hose fitting 76 can be removably secured to an opening 78 in the lid 74, and a vacuum hose 80 removably attached to the fitting 76.

The preferred material for the filter bag is a depth filter material which generates an electrostatic charge as dry air flows therethrough. A suitable material is a blend of modacrylic and propylene fibers formed into a mat or needled felt of about ¼ inch in thickness, which may also include a scrim backing, such as is sold by Enhanced Filter Company of Ventura, Calif. under the tradename ELEC-TROSTAT. The material used to form the filter bag 38 preferably has a filtering efficiency of 99.95% for particles 0.2 microns or greater, and the final filter is formed of material having and efficiency of 99.98% for particles 0.3 microns or greater.

OPERATION

It will be readily understood from FIG. 1 that a unidirectional flow of air in the hospital provides increased safety for visitors as well as the patient. The stationary or first HEPA filter 12 serves to collect dry hazardous particles of an invisible size from the air, including bacteria, viruses, and particles harmful to the human breathing system or which could cause transmission of disease or infection if inhaled.

Figure 4:
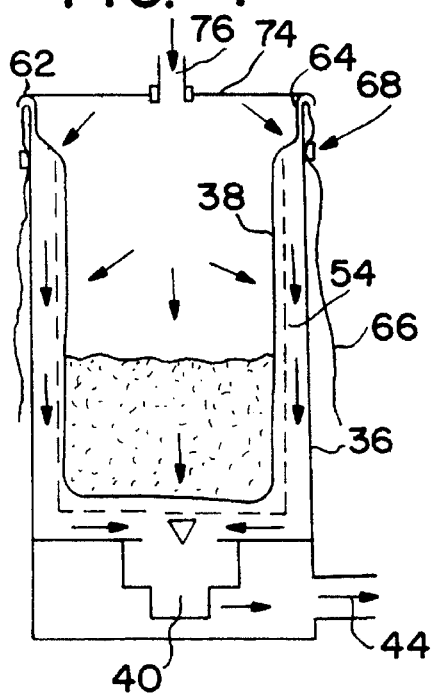
FIG. 4 is a cross-sectional elevation view of the filter bag of FIG. 3 after it has been filled.

At selected time intervals the transportable apparatus 34 of FIG. 3 is used to clean the stationary filter 12 of FIGS. 1 and 2. A vacuum is generated by the vacuum blower 40 of the portable unit, and a vacuum hose 80 is coupled between the lid 74 at the vacuum hose fitting 76 and the cleaning head 30, shown in FIG. 2, that actually cleans the stationary filter 12. When a sufficient amount of material collected on the stationary filter 12 has been transferred to the filter bag 38, the cleaning head 30 and hose 80 are detached, leaving the filter bag 38 in the canister 36 in the condition shown in FIG. 4.

Figure 5:
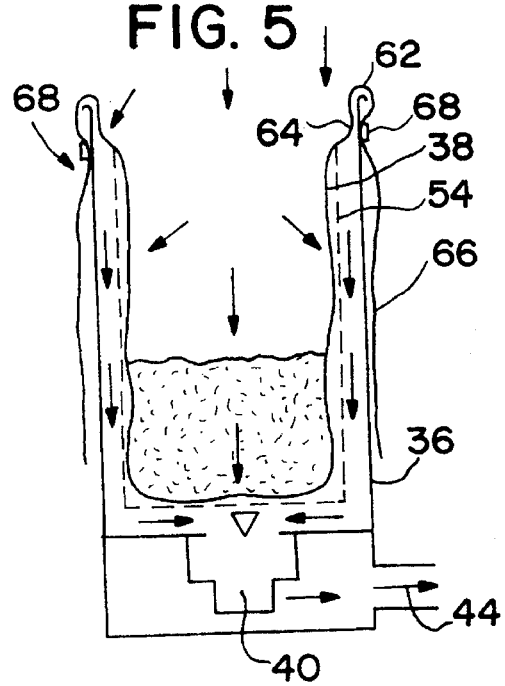
FIG. 5 is a cross-sectional elevation view of the filter bag of FIG. 3 after the lid has been removed from the top of the container.
Figure 6:
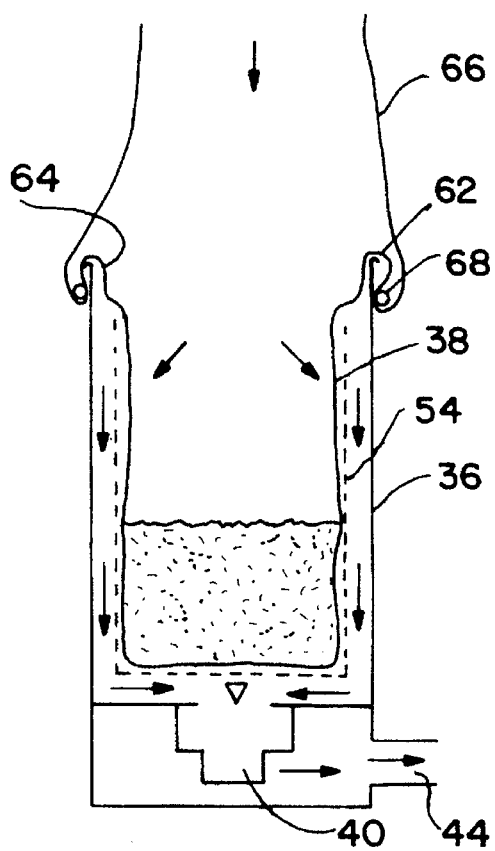
FIG. 6 is a cross-sectional elevation view of the filter bag of FIG. 3 after its turned-down top portion has been lifted up for closing the bag.
Figure 7:
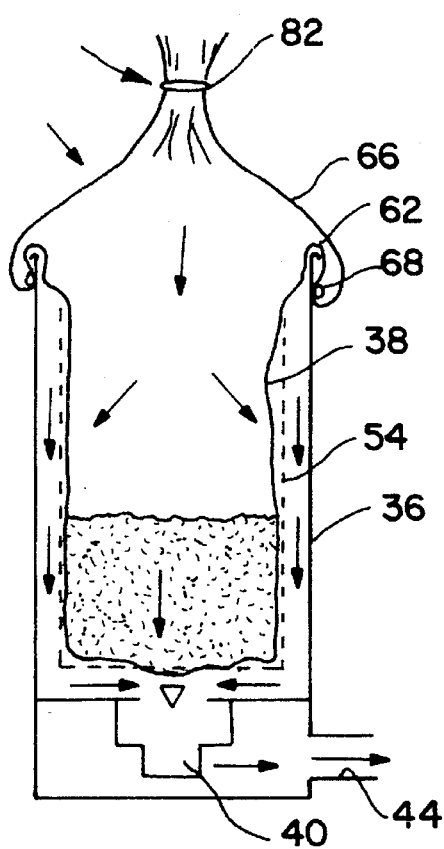
FIG. 7 is a cross-sectional elevation view of the filter bag of FIG. 3 as its turned-down top portion is being tied closed.
Figure 8:
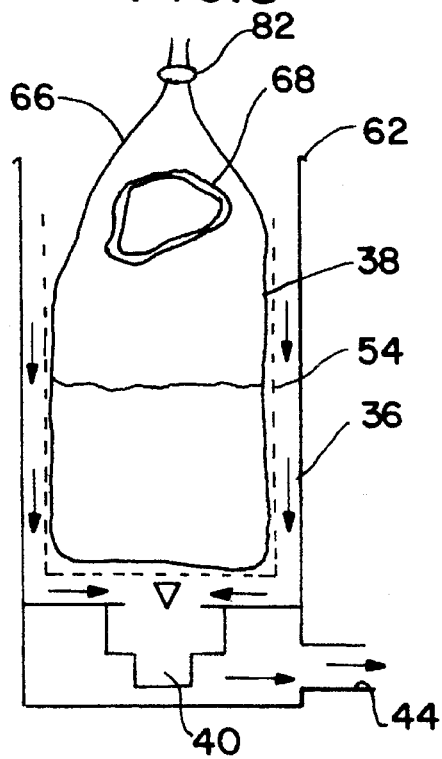
FIG. 8 is a cross-sectional elevation view of the filter bag of FIG. 3 after its turned-down top portion has been tied closed, showing escape of a rubber band that aided the closure process.
Figure 9:
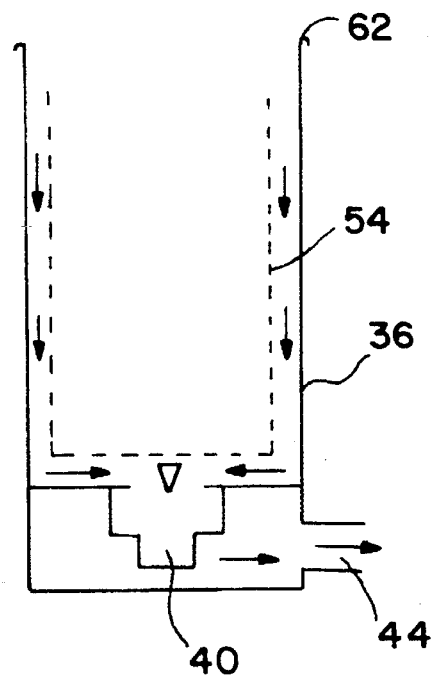
FIG. 9 is a cross-sectional elevation view showing the container after removal of the filled bag.

In general, a method of removing airborne particulate material collected from the air by a stationary HEPA filter and disposing of it in a controlled manner includes the steps of:

a) selecting an open-topped HEPA filter bag 38 made of flexible, porous, high-efficiency filter media material, the bag being flared outwardly at its open end;

b) selecting an open-topped container 36 having an outer impervious wall, an inner mesh wall 54 of which at least a portion is perforated to permit air flow therethrough, the container having an annular space 56 between the inner mesh wall 54 and the container wall;

c) placing the selected filter bag 38 within the mesh wall 54 of the container 36 with the open top of the bag 38 projecting outward beyond the open end of the mesh wall 54;

d) turning the upper extremity 66 of the open end of the bag 38 over the otherwise open ends of both the mesh wall 56 and the top 62 of the canister 36 to thereby close off the annular space 54 therebetween, a further portion of the upper extremity 66 of the open end of the bag 38 being in a turned-down relation about the top 62 and along the outer wall of the canister 36, the turned down portion of the bag being temporarily secured to the outer surface of the canister 36 by an elastic closure 68;

e) placing a lid 74 on the top 62 of the canister 36, thus trapping the filter bag 38 between the canister top 62 and the lid 74 to create an air tight seal at the top of the canister 36;

f) generating a vacuum in the annular space 56 so that air is drawn through a vacuum hose 80 attached to the fitting 76 in the lid 74, into the open end of the bag 38 and through the porous wall of the filter bag 38 into the annular space 56, the particulate material in the air being retained within the bag 38, the filtered air being exhausted through a final filter 42 and to the ambient (FIG. 3, 4);

g) while keeping the space between the inner and outer walls of the container closed by the flared upper extremity 64 of the bag 38, and also still maintaining the vacuum in the annular space 50, removing the lid 74 (FIG. 5), raising the further portion 66 of the upper extremity of the filter bag 38 above the top edge 62 of the canister 36 (FIG. 6), gathering the material together to close the opening in the top of the bag and sealing the raised upper extremity of the filter bag, preferably by applying a tie 82 around the gathered filter material to prevent particulate material that has already been received in the bag from escaping before the closing action is completed (FIG. 7); and h) releasing the elastic band 68 (FIG. 8), the applied vacuum evacuating at least some of the air from within the now closed bag, and removing the closed bag, with particulate material therein, from the canister 36 (FIG. 9).

In this manner the lid 74 can be removed from the container 36 while suction continues to be applied to the outer surface of the vacuum bag 38 and the contained material collected therein. Further, the continuous flow of air downward into the bag during the process holds the collected material in place and protects the operator from exposure to those hazardous materials. In this manner, the bag can be closed, at least some of the air within the bag exhausted by the vacuum applied to the porous walls, and the bag removed for disposal.

Although the present invention has been described in considerable detail with reference to a certain preferred version and use thereof, other versions and uses are possible. For example, the transportable system can be used to safely clean and dispose of hazardous materials removed from cleanable HEPA filters in various different installations. Examples of environments where the transportable unit has application is food processing plants to remove air bourn spores, pharmaceutical production facilities, particularly where live cultures are used to produce vaccines, semiconductor production facilities where the atmosphere can contain vaporized and particulate hazardous metals. Therefore, the spirit and scope of the appended claims should not be limited to the description of the preferred versions contained herein.

What is claimed is:

1. A method of removing airborne particulate material from the air and disposing of it in a controlled manner, comprising the steps of:

selecting an open-topped HEPA filter bag made of flexible, porous, high-efficiency filter media which is flared outwardly at its open end;

selecting an open-topped container having an outer impervious wall, an inner wall of which at least a portion is perforated to permit air flow there through, and an annular space between the inner and outer walls;

placing the bag within the inner wall of the container with the open top of the bag projecting outward beyond the open end of the inner wall;

turning a flared portion of the open end of the bag over the otherwise open ends of both the inner wall and the impervious outer wall to thereby close off the annular space therebetween;

turning a further extremity of the open end of the bag in a turned-down relation about the outer wall of the container;

placing a lid in sealing relationship on the open end of the container;

generating a vacuum in the annular space so that air is drawn through an opening in the lid and through the open end of the bag, particulate material in the air being retained in the bag;

while keeping the space between the inner and outer walls of the container closed by the flared end portion of the bag, and also still maintaining the vacuum in the annular space, pulling up and tying the down-turned further extremity of the bag so as to prevent particulate material that has already been received in the bag from escaping before the closing action is completed; and then removing the closed bag, with particulate material therein, from the container.

2. A method of removing dry particulate material from a filter system used to clean contaminated air of airborne particulate material and disposing of the particulate material in a controlled manner, comprising the steps of:

selecting an open-topped HEPA filter bag made of flexible, porous, high-efficiency filter media, the bag being flared outwardly at its open end;

selecting an open-topped container having an outer impervious wall, an inner wall of which at least a portion is perforated to permit air flow therethrough, an annular space existing between the inner and outer walls;

placing the bag within the inner wall of the container with the open top of the bag projecting outward beyond the open end of the inner wall;

turning the flared portion of the open end of the bag over the open ends of both the inner wall and the impervious outer wall to thereby close off the annular space therebetween;

turning a further extremity of the open end of the bag in a turned-down relation about the outer wall of the container;

placing a lid on the open end of the container, said lid having an opening therethrough;

generating a vacuum in the annular space so that air is drawn through the opening in the lid and a hose attached to that opening, into the open end of the bag, through the walls of the bag and into the annular space, the particulate material being retained in the bag;

disconnecting the hose from the lid before removing the lid;

while keeping the space between the inner and outer walls of the container closed by the flared end portion of the bag and maintaining the vacuum in the annular space, pulling up and tying the down-turned further extremity of the bag so as to prevent particulate material that has already been collected in the bag from escaping before the closing action is completed; and removing the closed bag, with particulate material therein, from the container.

* * * * *